US012650763B2

(12) United States Patent
Batra et al.

(10) Patent No.: US 12,650,763 B2
(45) Date of Patent: Jun. 9, 2026

(54) DIGITAL IMAGE EDITING USING CURVILINEAR PERSPECTIVE

(71) Applicant: Adobe Inc., San Jose, CA (US)

(72) Inventors: Karan Batra, Shamli (IN); Prem Kumar, Jalandhar City (IN); Navodit Madal, Meerut (IN); Ayush Bansal, Delhi (IN)

(73) Assignee: Adobe Inc., San Jose, CA (US)

( * ) Notice: Subject to any disclaimer, the term of this patent is extended or adjusted under 35 U.S.C. 154(b) by 202 days.

(21) Appl. No.: 18/410,022

(22) Filed: Jan. 11, 2024

(65) Prior Publication Data

US 2025/0231674 A1    Jul. 17, 2025

(51) Int. Cl.
*G06F 3/04845* (2022.01)
*G06F 3/04815* (2022.01)

(52) U.S. Cl.
CPC ...... *G06F 3/04845* (2013.01); *G06F 3/04815* (2013.01)

(58) Field of Classification Search
CPC .... G06T 5/00; G06T 3/00; G06T 7/00; G06T 7/80; G06T 11/20; G06T 7/20; G06T 7/70; G06T 1/00; G06T 7/11; G06T 7/536; G06T 7/60; G06T 11/00; G06T 5/40; G06T 7/13; G06T 7/187; G06T 7/593; G06T 17/00; G06T 3/4053; G06T 5/70; G06T 7/181; G06T 7/73
See application file for complete search history.

(56) References Cited

U.S. PATENT DOCUMENTS

| | | | | |
|---|---|---|---|---|
| 2008/0306680 A1* | 12/2008 | Marty | ...................... | G08G 5/32 |
| | | | | 701/533 |
| 2013/0236093 A1* | 9/2013 | Gatt | ...................... | G06F 3/0482 |
| | | | | 382/311 |
| 2020/0226805 A1* | 7/2020 | Szeliski | ............... | G06V 10/443 |
| 2021/0326608 A1* | 10/2021 | Yoshimi | ................ | G06V 20/58 |

OTHER PUBLICATIONS

Line Art school, How to Draw a City in 5-Point Perspective: Narrated Step by Step, Apr. 20, 2019, https://www.youtube.com/watch?v=EV0IVyfK_5s&list=PLnifj-hFGWC9zd4wbYMdb7aGE0VB5z6ud.*
Beardshaw, Dan , "How To Construct A 5-Points Perspective (Fish Eye) Grid (Step By Step)", YouTube video uploaded by user Dan Beardshaw [retrieved Nov. 22, 2023]. Retrieved from the Internet <https://www.youtube.com/watch?v=SyfVk3BztXQ>, Mar. 7, 2022, 4 pages.
Beardshaw, Dan , "How To Draw In 5 Point Perspective (Fish Eye)—Interior View Drawing Tutorial", YouTube video, uploaded by user Dan Beardshaw [retrieved Nov. 22, 2023]. Retrieved from the Internet <https://www.youtube.com/watch?v=PYAdcZiJvhl>, Apr. 5, 2022, 3 pages.

* cited by examiner

*Primary Examiner* — Rayeez R Chowdhury
(74) *Attorney, Agent, or Firm* — FIG. 1 Patents

(57) ABSTRACT

Curvilinear perspective digital image editing techniques are described. In one or more examples, a digital image and a curvilinear grid are presented for display in a user interface. The curvilinear grid depicts a plurality of axis connecting vanishing points as indicating a curvilinear perspective. An input is received defining an edit operation to the digital image. The input is conformed based on the curvilinear grid and the user interface is output having the edit operation applied to the digital image as conformed based on the curvilinear grid. The user interface is output having the edit operation applied to the digital image as conformed based on the curvilinear grid.

20 Claims, 11 Drawing Sheets

Figure 1:
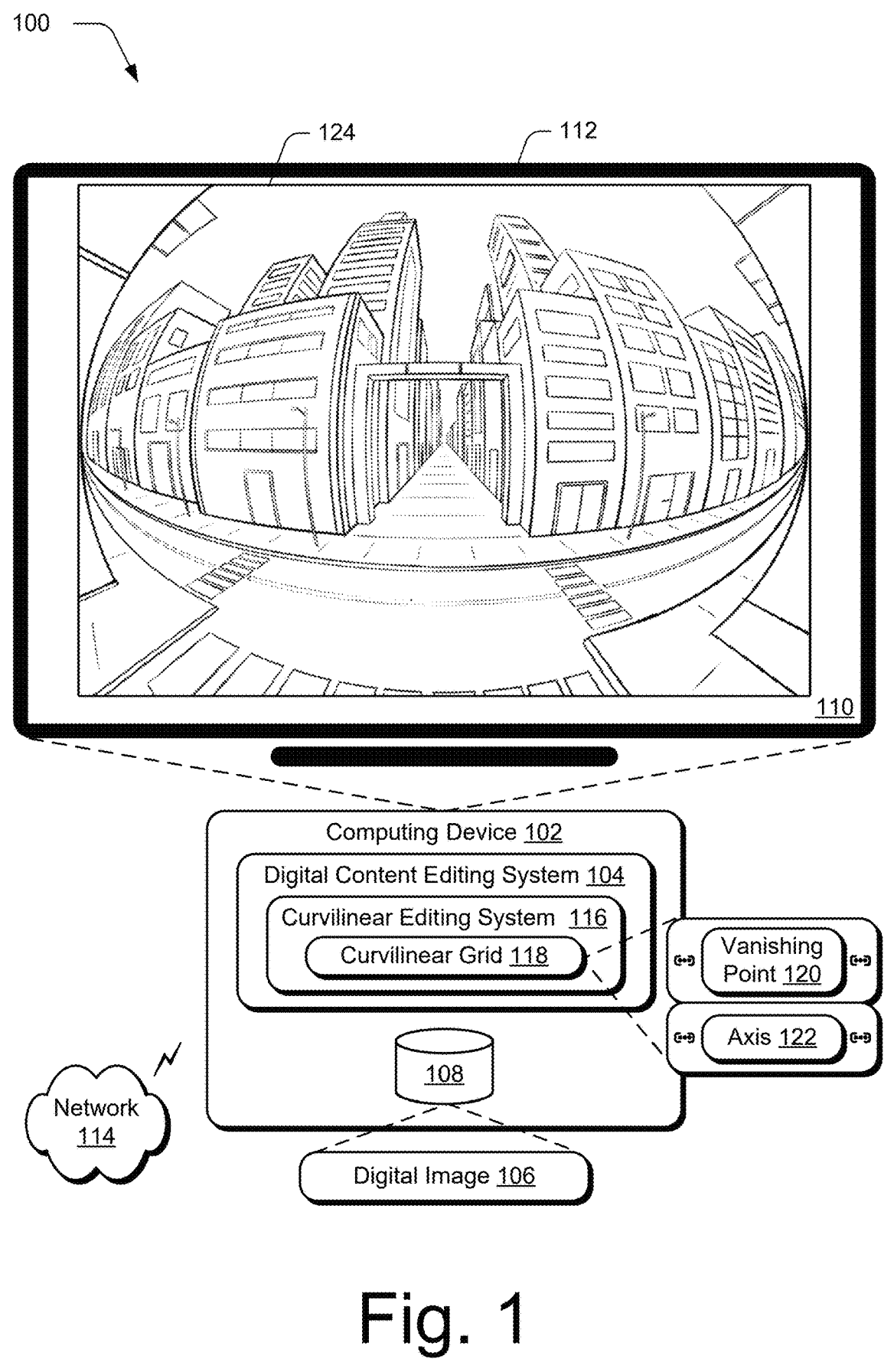

100

124     112

110

Computing Device 102

Digital Content Editing System 104

Curvilinear Editing System 116

Curvilinear Grid 118

Vanishing Point 120

Axis 122

108

Network 114

Digital Image 106

Third
Vanishing
Point
120(3)

118

122

First
Vanishing
Point
120(1)

Second
Vanishing
Point
120(2)

Fourth
Vanishing
Point
120(4)

400

118

Third
Vanishing
Point
120(3)

122

First
Vanishing
Point
120(1)

Fifth
Vanishing
Point
120(5)

Second
Vanishing
Point
120(2)

Fourth
Vanishing
Point
120(4)

800

118

110

900

110

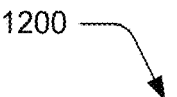
1200

1202
Present a curvilinear grid for display in a user interface, the curvilinear grid depicting a plurality of axis connecting vanishing points as indicating a curvilinear perspective > 1204
> Generate a candidate curvilinear grid for display in the user interface > 1206
> Receive a modification to the candidate curvilinear grid > 1208
> Generate the curvilinear grid as having the modification to the candidate curvilinear grid

1210
Receive an input defining an edit operation to a digital image

1212
Conform the input based on the curvilinear grid

1214
Present the user interface having the edit operation applied to the digital image as conformed based on the curvilinear grid

DIGITAL IMAGE EDITING USING CURVILINEAR PERSPECTIVE

BACKGROUND

Curvilinear perspective is a technique usable as part of content creation to represent a three-dimensional environment using a flat surface, e.g., to offer a "fisheye" perspective, "stretched" panoramas, and so forth. Curvilinear perspective departs from a linear perspective and is typically used to evoke a sense of depth, volume, movement, or energy as part of content creation, e.g., for two-dimensional digital images.

Conventional techniques used to implement a curvilinear perspective, however, rely on manual interactions to configure an appearance of the objects within a depicted environment so as to be consistent with the curvilinear perspective. The manual interactions are typically laborious, prone to error, and do not support subsequent changes to the content to address a change in the curvilinear perspective. Accordingly, conventional techniques used in support of curvilinear perspective often result in visual inaccuracies in real world scenarios and are inefficient both to computing devices that implement the techniques as well as in user interaction utilized as part of the techniques.

SUMMARY

Curvilinear perspective digital image editing techniques are described. In one or more examples, a digital image and a curvilinear grid are presented for display in a user interface by a curvilinear editing system. The curvilinear grid depicts a plurality of axis connecting vanishing points as indicating a curvilinear perspective. An input is received by the curvilinear editing system defining an edit operation to the digital image. The input is conformed by the curvilinear editing system based on the curvilinear grid and the user interface is output having the edit operation applied to the digital image as conformed based on the curvilinear grid.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 1 is an illustration of a digital medium environment in an example implementation that is operable to employ curvilinear perspective techniques described herein.

FIG. 12 is a flow diagram depicting an algorithm as a step-by-step procedure in an example implementation of operations performable for accomplishing a result of digital image editing using curvilinear perspective as constrained based on a curvilinear grid.

DETAILED DESCRIPTION

Overview

Figure 2:
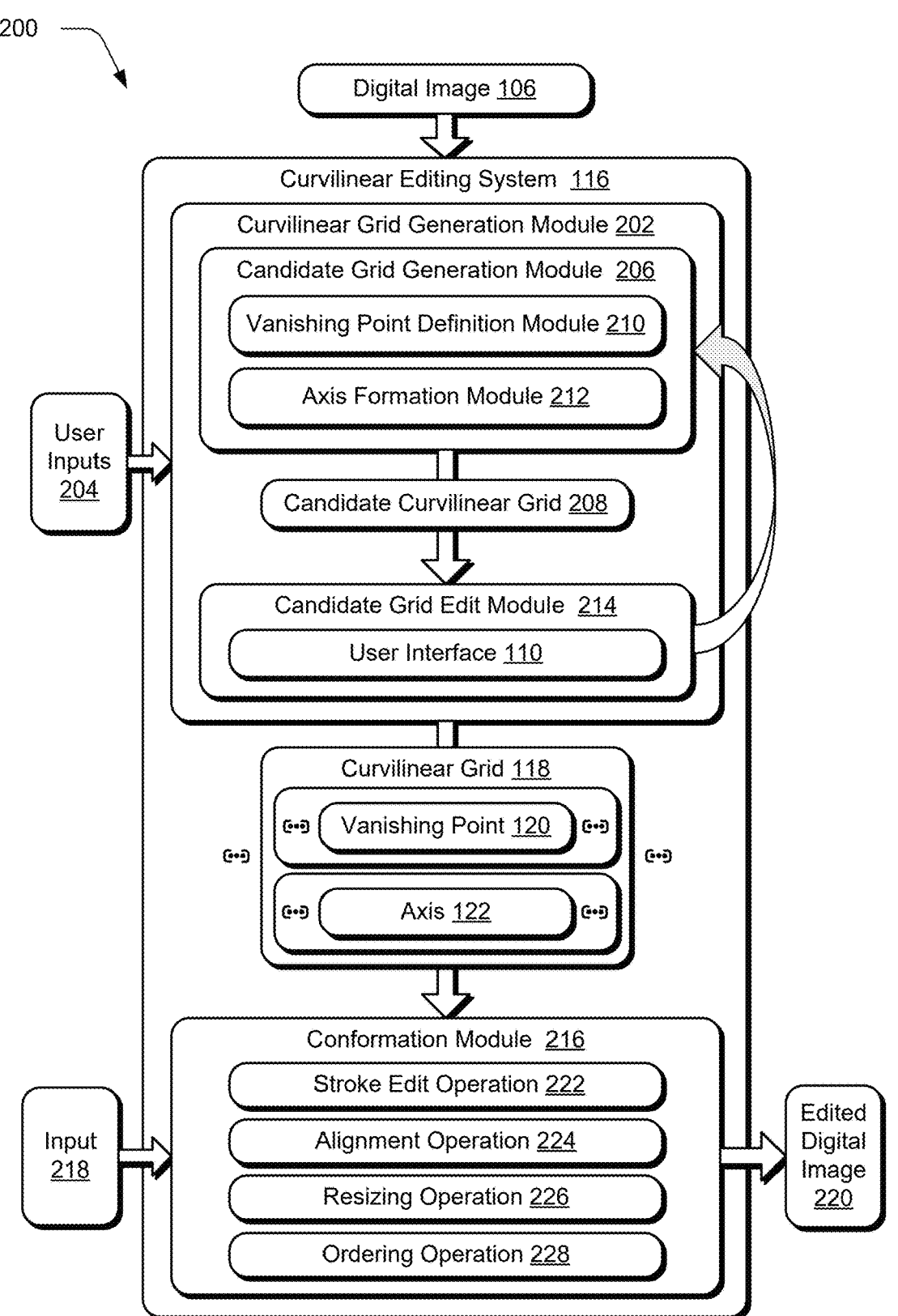
FIG. 2 depicts a system in an example implementation showing operation of a curvilinear editing system of FIG. 1 in greater detail as generating a curvilinear grid and editing a digital image using the curvilinear grid.

Curvilinear perspective is a technique usable in creation of physical and digital content, which departs from a conventional linear perspective by employing curved lines and vanishing points. Curvilinear perspective supports an increased ability to employ a variety of immersive and natural representations of a three-dimensional environment using a flat surface, e.g., for two-dimensional digital content. This departure provides an ability to explore spatial possibilities of compositions in a dynamic and fluid manner as part of content creation, offering a versatile tool for creative expression which is not possible when using a linear perspective.

Curved lines, for instance, are incorporated as part of the content to evoke a sense of depth, volume, movement, and energy, resulting in visually captivating and engaging compositions. Conventional techniques used to implement a curvilinear perspective, however, rely on manual interactions which are laborious, prone to error, and do not support subsequent changes to the content in support of a change in the curvilinear perspective. As a result, conventional techniques used in support of curvilinear perspective are inefficient, arduous, and often result in visual inaccuracies in real world scenarios and increased power consumption by computing devices that implement these techniques.

Accordingly, digital image editing techniques are described that support curvilinear perspective. To do so, these techniques support generation and modification of one or more curvilinear grids in a user interface that define curvilinear perspective within a digital image. The curvilinear grids are defined using vanishing points, which indicate a point at which parallel lines appear to converge in the digital image. A plurality of axis is defined based on the vanishing points (e.g., between two respective vanishing points using ellipses) which form a layout of the curvilinear grid.

The curvilinear grid is usable in support of a variety of curvilinear perspectives, e.g., as part of one-point, two-point, three-point, and other perspectives. To do so, a curvilinear editing system that implements the curvilinear grid is configurable to support a variety of functionality.

The curvilinear editing system, for instance, is configurable to generate one or more curvilinear grids for presentation in a user interface. The curvilinear editing system, in one or more examples, receives user inputs that define a number of vanishing points to be used for a respective curvilinear grid, a number of curvilinear grids to be generated, and so on. The curvilinear editing system then generates curvilinear grids based on the user inputs, predefined inputs (e.g., for a default implementation), and so on.

The curvilinear editing system also supports further modifications to the curvilinear grids. Examples of modifications include relocation of one or more of the vanishing points, relocation of the curvilinear grid as a whole, movement of an axis defined with the curvilinear grid, change in orientation, and so on. In this way, the modifications support changes in how a curvilinear perspective is expressed in relation to the digital image, e.g., to create a sense of depth and three-dimensionality in a two-dimensional digital image, a type of curvilinear perspective that is to be expressed by the grid, and so forth.

The curvilinear grid, once generated, is then usable as a basis by the curvilinear editing system to control edit operations to a digital image. The curvilinear editing system, for instance, is usable to conform strokes (e.g., drawn lines) received via the user interface to follow alignment with a respective axis defined by the curvilinear grids. The curvilinear editing system is also usable to align objects based on an axis, implement a snapping operation to control object movement for alignment in relation to an axis, control z-ordering of objects in a digital image based on association with a respective axis of the curvilinear grid, and so on. The curvilinear grid is also usable to support edit operations to strokes and other objects included in the digital image, automatically and without user intervention, responsive to changes to the curvilinear grid described above, e.g., changes in locations of the vanishing points, inclusion of additional vanishing points, orientations of the curvilinear grids as a whole, and so on.

In this way, the curvilinear editing system supports an ability to assist implementation of a curvilinear perspective as part of a digital image, thereby unlocking increased levels of visual engagement with increased accuracy that is not possible using conventional techniques. Further discussion of these and other examples is included in the following sections and shown in corresponding figures.

In the following discussion, an example environment is described that employs the curvilinear perspective techniques described herein. Example procedures are also described that are performable in the example environment as well as other environments. Consequently, performance of the example procedures is not limited to the example environment and the example environment is not limited to performance of the example procedures.

Example Curvilinear Perspective Editing Environment

FIG. 1 is an illustration of a digital medium environment 100 in an example implementation that is operable to employ curvilinear perspective techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 13.

The computing device 102 is illustrated as including a digital content editing system 104. The digital content editing system 104 is implemented at least partially in hardware of the computing device 102 to process and transform digital content, an example of which is illustrated as a digital image 106 maintained in a storage device 108 of the computing device 102. Examples of a digital image 106 include a digital document (e.g., portable document format), raster images, vector images, and so on. Processing by the digital content editing system 104 includes creation of the digital image 106, modification of the digital image 106, and rendering of the digital image 106 in a user interface 110 for output, e.g., by a display device 112. Although illustrated as implemented locally at the computing device 102, functionality of the digital content editing system 104 is also configurable as whole or part via functionality available via the network 114, such as part of a web service or "in the cloud."

An example of functionality incorporated by the digital content editing system 104 to process the digital image 106 is illustrated as a curvilinear editing system 116. The curvilinear editing system 116 is configured to address technical challenges in conventional techniques used to incorporate curvilinear perspective within content, e.g., the digital image 106. Conventional techniques, for instance, rely on manual interaction to define vanishing points and calculate multiple ellipses in order to generate the grid, which consumes a significant amount of user time, resources, and is prone to error. Creatives, for instance, in physical examples use compasses, rulers, and other drafting tools to manually construct curved lines and grids, which involves painstakingly mapping out the perspective of curved objects through trial and error. This manual process involves significant skill and specialized experience gained over a significant amount of time, followed by time-consuming adjustments to achieve the desired effect in real world scenarios.

Use of the grids, once constructed, also involves precise calculation in order to ensure that the artwork follows rules of the grid. Complexity of the grids increases in real world scenarios as a number of objects increases, e.g., strokes such as freeform lines, vector objects, raster objects, etc. An increase in the number of objects, for instance, causes a corresponding increase in an amount excess lines and clutter that is visually confusing and detracts from an overall impact of the digital image being created, thereby hindering content creation. These challenges are further exacerbated when attempting to utilize multiple curvilinear grids, e.g., for equidistant grids which are also referred to as "infinite" grids.

To address these and other technical challenges, the curvilinear editing system 116 is configured to generate one or more curvilinear grids, an example of which is illustrated as curvilinear grid 118. The curvilinear grid 118 is defined based on one or more vanishing points, illustrated as vanishing point 120, and a plurality of axis, and example of which is illustrated as axis 122. Curvature of the axis 122 based on the vanishing point 120 is used to define the curvilinear grid 118. The axis 122, for instance, are configurable as ellipses to link a respective pair of vanishing points 120.

The curvilinear grid 118 supports modifications based on user inputs received via the user interface 110 by the curvilinear editing system 116. A number of vanishing points 120 used to define the curvilinear grid 118, for instance, may be defined and redefined based on the user inputs. The number of vanishing points 120 is usable to define a one-point perspective (e.g., a single vanishing point on a horizon), a two-point perspective (e.g., using two vanishing points to draw an object at an angle to a viewer such as a corner of a building), a three-point perspective (e.g., adding a third vanishing point for high or low viewpoints), a four-point perspective (e.g., 360 degree view), a five-point perspective using five vanishing points (e.g., a fisheye lens as illustrated for the building example 124), and so forth. Use of a number of perspectives and corresponding vanishing points greater than three is not supported by conventional techniques and systems, and as such the curvilinear editing system 116 is configured to implement curvilinear perspectives that are not possible using conventional techniques.

A number of curvilinear grids 118 included in the user interface 110 may also be user defined. A user input, for instance, may be received to specify use of a single curvilinear grid, a series of connected curvilinear grids (e.g., in which a location of a single vanishing point is shared by multiple curvilinear grids), and so forth.

Modifications may also be received via the user interface 110, e.g., in support of movement of the vanishing point 120, curvature of the axis 122, orientation of the curvilinear grid 118, and so forth. These modifications may be populated, automatically and without user intervention, by the curvilinear editing system 116 to objects included in the digital image 106 as defined by the curvilinear grid 118, which is also not possible in conventional techniques.

Thus, the curvilinear editing system 116 is configured to generate the curvilinear grid 118 automatically and as such avoid a conventional manual step-by-step process. The curvilinear editing system 116 also supports an intuitive creation process that is easy to understand and does not involve complex conventional techniques. Additionally, the curvilinear editing system 116 supports versatile grid transformation to modify the curvilinear grid 118 vertically, horizontally, or set an orientation thereby providing flexibility in aligning and arranging objects within the digital image 106.

The curvilinear editing system 116 is also configurable to support seamless pattern continuation. Consider a scenario in which a stylus is close to an initial point of contact, for instance, the curvilinear editing system 116 continues the pattern seamlessly as aligned with the curvilinear editing system 116. The curvilinear editing system 116 also supports generation of visual guides as drawing aids to support curvilinear perspective awareness. In this way, creatives are provided with an enhanced experience to achieve objects with increased accuracy by utilizing drawing aids that leverage the curvilinear grid 118 in support of a curvilinear perspective. The curvilinear editing system 116 also supports compatibility with various edit operations, e.g., both vector and raster brushes including live brushes such as those mimicking watercolor and oil paints. These brushes, and respective edit operations, are configurable to mix colors in real time, thereby providing a dynamic and realistic painting experience when employed by the curvilinear editing system 116.

The curvilinear editing system 116 also support direct drawing as constrained to a curvilinear perspective using the curvilinear grid 118. The curvilinear editing system 116, for instance, enables creatives to incorporate a curvilinear perspective directly without manually generating a grid beforehand. This feature streamlines the process and allows creatives to focus on content creation with reduced distractions. The curvilinear editing system 116 also supports a customizable grid size as previously described such that creatives are given the ability to customize the size of the curvilinear grid 118. This customization option ensures that the curvilinear editing system 116 is aligned with a background of the 106 (e.g., a drawing canvas) thereby enhancing precision and accuracy.

The curvilinear editing system 116 also supports an ability to conform edit operations based on the curvilinear grid 118. The curvilinear editing system 116, for instance, automatically realigns a stroke input via the user interface 110 to follow the curvilinear grid 118. The stroke input may be aligned in real time as entered, in response to selection of an option in the user interface 110 to initiate realignment, and so on. The curvilinear editing system 116 also simplifies operations to transform and translate the curvilinear grid 118 within the user interface 110, thereby supporting increased flexibility and experimentation which is not possible in conventionality techniques. By incorporating these features as part of the digital content editing system 104, the curvilinear editing system 116 supports an ability of creatives to employ curvilinear perspective as part of digital image 106 creation. Further discussion of these and other examples is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Curvilinear Grid Generation and Edit Operation Control

The following discussion describes curvilinear perspective techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm. FIG. 12 is a flow diagram depicting an algorithm 1200 as a step-by-step procedure in an example implementation of operations performable for accomplishing a result of digital image editing using curvilinear perspective as constrained based on a curvilinear grid. In portions of the following discussion, reference is made in parallel to the algorithm 1200 of FIG. 12.

FIG. 2 depicts a system 200 in an example implementation showing operation of the curvilinear editing system 116 of FIG. 1 in greater detail as generating a curvilinear grid 118 and editing a digital image 106 using the curvilinear grid 118. To begin in this example, a curvilinear grid generation module 202 is employed to generate the curvilinear grid 118. The curvilinear grid 118 is then presented for display in a user interface 110. The curvilinear grid 118 depicts a plurality of axis 122 connecting vanishing points 120 as indicating a curvilinear perspective (block 1202).

Figure 3:
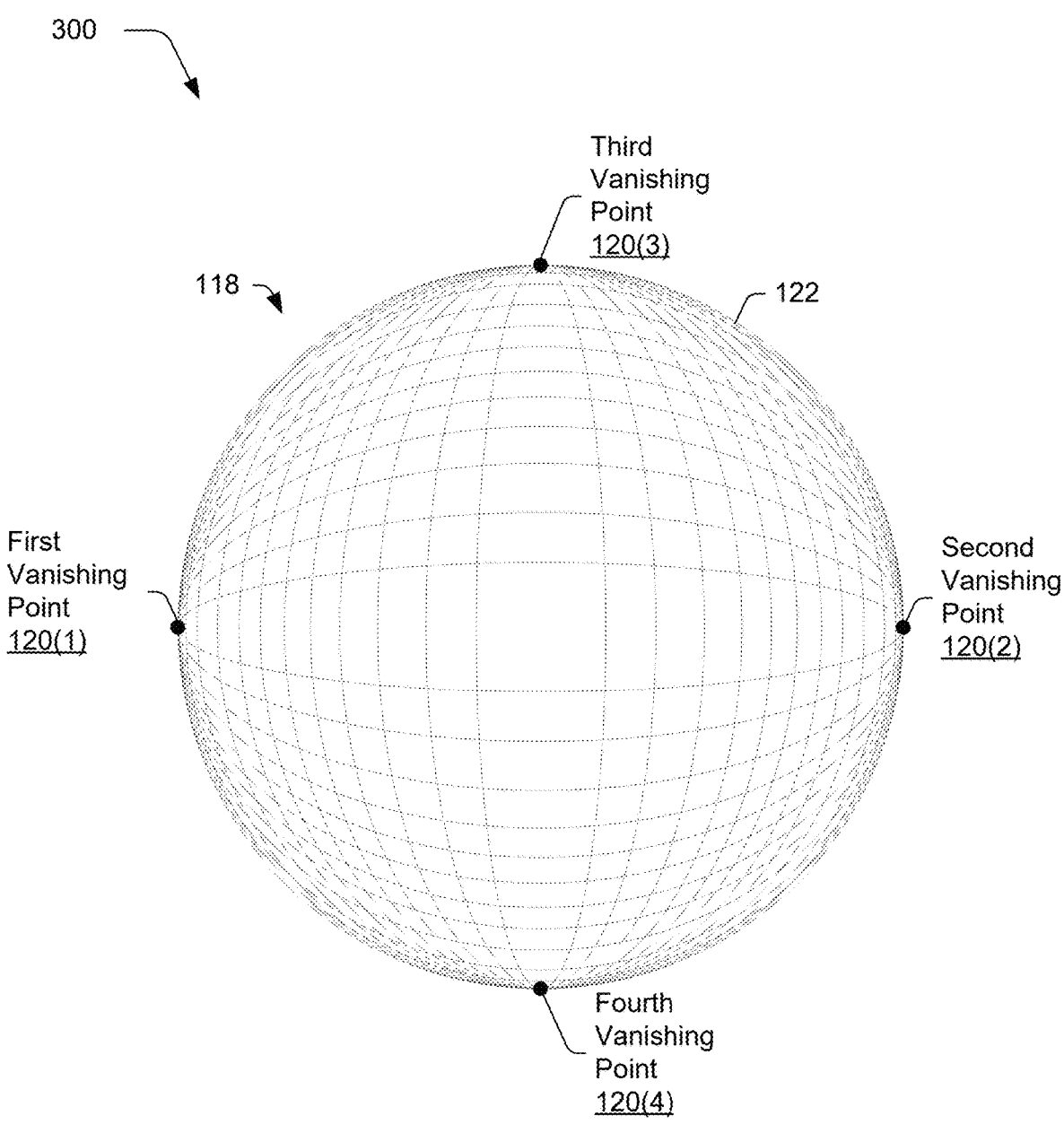
FIG. 3 depicts an example implementation showing a curvilinear grid having four vanishing points.

In a first example, the curvilinear grid generation module 202 does so responsive to a user input 204, e.g., to specify a number of curvilinear grids, number of vanishing points to be utilized to construct each grid, and so on. Vanishing points 120, as previously described, define a point at which parallel lines appear to converge within a respective digital image 106. FIG. 3, for instance, depicts an example implementation 300 showing a curvilinear grid 118 having four vanishing points. The curvilinear grid 118 in the illustrated example includes a first vanishing point 120(1) disposed opposite a second vanishing point 120(2). Likewise, a third vanishing point 120(3) is disposed opposite a fourth vanishing point 120(4). Axis 120 are used to connect pairs of respective vanishing points in the illustrated example.

Figure 4:
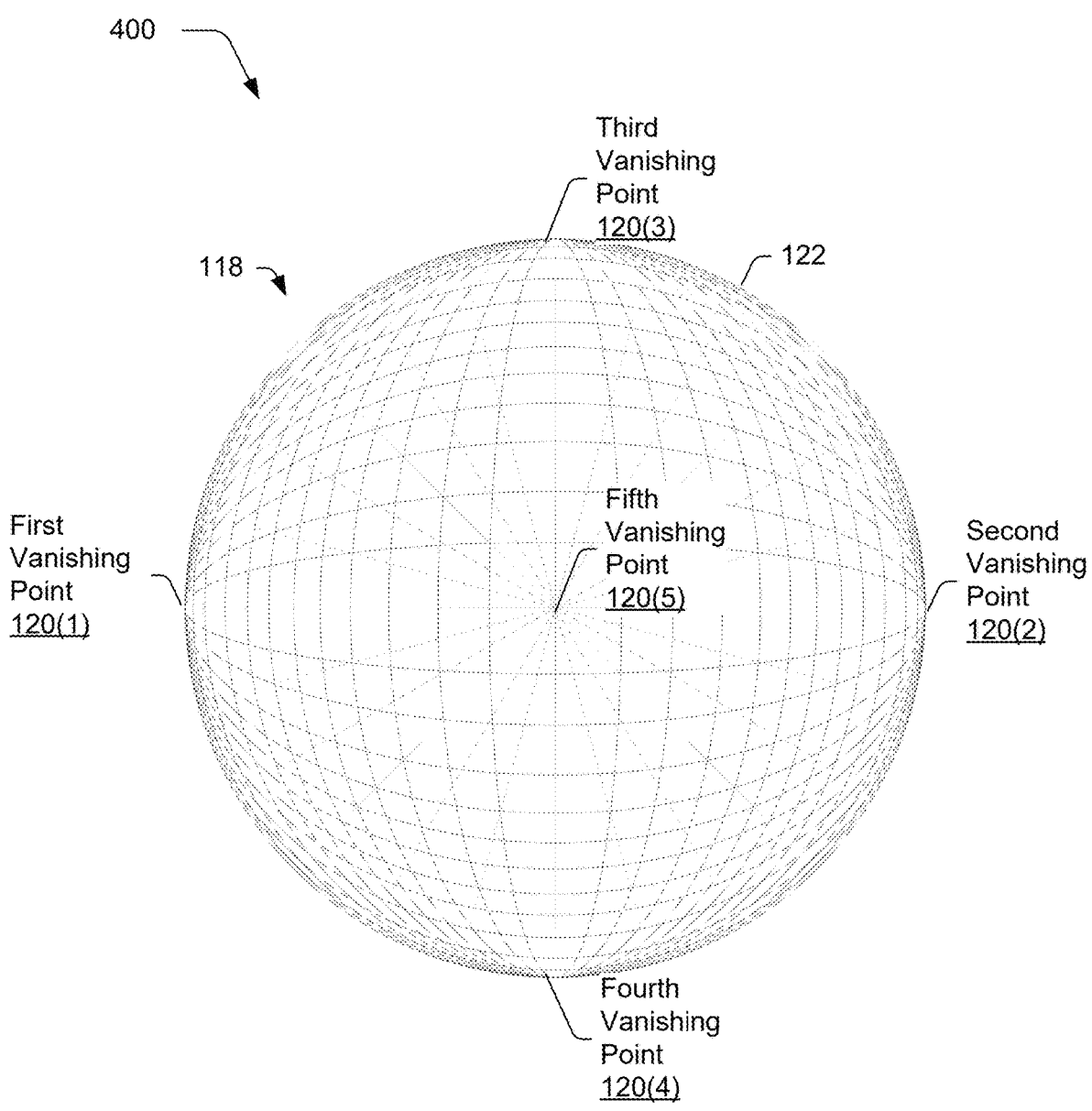
FIG. 4 depicts an example implementation showing a curvilinear grid having five vanishing points.

FIG. 4 depicts an example implementation 400 showing a curvilinear grid 118 having five vanishing points. The curvilinear grid 118 in the illustrated example also includes a first vanishing point 120(1) disposed opposite a second vanishing point 120(2). Likewise, a third vanishing point 120(3) is disposed opposite a fourth vanishing point 120(4). A fifth vanishing point 120(5) is disposed in a center point between the first, second, third, and fourth vanishing points 120(1)-120(4). Axis 122 are also defined in this example based on the vanishing points.

The curvilinear grid generation module 202 is configured to generate the curvilinear grid 118 in a variety of ways. The curvilinear grid generation module 202, for instance, may receive one or more user inputs 204 that define a number of vanishing points to be used to generate the curvilinear grid 118, a number of curvilinear grids 118, and so on. In another instance, the curvilinear grid generation module 202 generates the curvilinear grid 118 based on a default configuration, such as to "fill" a digital image 106 displayed in the user interface 110.

The curvilinear grid generation module 202 also supports user inputs 204 to modify the curvilinear grid 118. The curvilinear grid generation module 202, for instance, employes a candidate grid generation module 206 to generate a candidate curvilinear grid 208 for display in a user interface (block 1204). The candidate grid generation module 206 includes a vanishing point definition module 210 that is used to define numbers and/or locations of vanishing points 120 within the curvilinear grid 118. The candidate grid generation module 206 also includes an axis formation module 212 to form axis 122 based on the vanishing point 120. The axis 122, for instance, may be generated as ellipses that connect pairs of vanishing points, radiate outward from a vanishing point, and so forth.

A modification is then received by a candidate grid edit module 214 to the candidate curvilinear grid 208 (block

1206) via the user interface 110. User inputs 204, for example, may be received to relocate the vanishing points, reorient the candidate curvilinear grid 208 (e.g., rotate the candidate curvilinear grid 208), change a degree of curvature of the axis 122, and so forth. The curvilinear grid 118 is generated as having the modification to the candidate curvilinear grid (block 1208), e.g., based on edits made to the vanishing point 120 and/or the axis 122 used to define the curvilinear grid 118.

The curvilinear grid 118, once generated, then acts as a basis by the curvilinear editing system 116 to control edit operations so as to conform to the curvilinear grid 118 and therefore a curvilinear perspective defined by the curvilinear grid 118. The curvilinear editing system 116, for instance, employs an conformation module 216 that is configured to receive an input 218 defining an edition operation to a digital image (block 1210). The user inputs 218 is conformed by the conformation module 216 based on the curvilinear grid 118 (block 1212). The user interface is then presented as having the edit operation applied to the digital image as conformed based on the curvilinear grid 118 (block 1214) to form an editing digital image 220. The edit operation may take a variety of forms, examples of which include a stroke edit operation 222, alignment operation 224, resizing operation 226, ordering operation 228, and so on.

Figure 5:
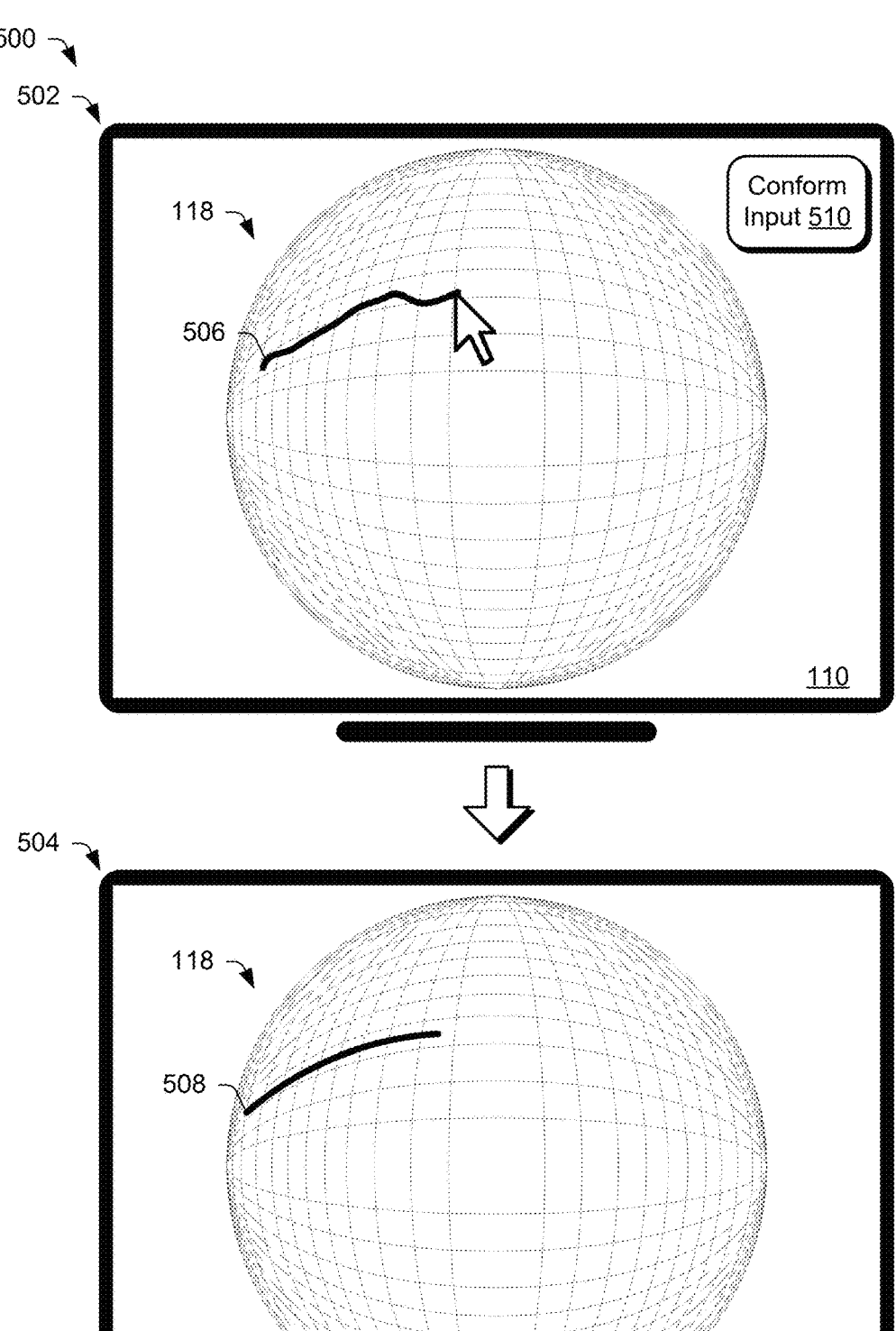
FIG. 5 depicts an example implementation showing conformation of an input as part of an edit operation received via a user interface in accordance with a curvilinear grid.

FIG. 5 depicts an example implementation 500 showing conformation of an input as part of an edit operation received via a user interface in accordance with a curvilinear grid 118. This example implementation is illustrated using a first stage 502 and a second stage 504. At the first stage 502, an input is received to specify a stroke in the user interface 110 as a freeform line 506. The conformation module 216 then conforms the freeform line 506 to follow an axis 122 of the curvilinear grid 118, as shown as a conformed line 508 at the second stage 504. The conformation module 216, for instance, conforms the freeform line 506 in real time as the input 218 is received, is performed responsive to selection of an option 510 in the user interface 110 to "conform input," and so on. In this way, the curvilinear editing system 116 supports efficient implementation of a curvilinear perspective as part of a digital image 106.

The curvilinear editing system 116 also supports conformation of a variety of other edit operations. For an alignment operation 224, for instance, the conformation module 216 is configured to align objects, one to another, based on the axis 122 defined by the vanishing point 120 of the curvilinear grid 118. An example of an alignment operation 224 includes a snapping operation that is usable to control placement of objects within the user interface 110, e.g., which are automatically moved from one location to another when within a threshold distance of a vanishing point 120, axis 122, and so on. For a resizing operation 226, the conformation module 216 conforms the size of the objects based on location with respect of a respective axis 122 of the curvilinear grid 118. The conformation module 216, for example, is configurable to change a dimension of the object based on location with respect to an ellipse defined by an axis, e.g., for consistency in depth in an environment defined by the curvilinear grid 118. Likewise, an ordering operation 228 is also adjustable by the conformation module 216 to control a z-ordering of objects in the digital image 106 (e.g., overlap) based on location with respect to the axis 122. A variety of other examples are also contemplated.

Figure 6:
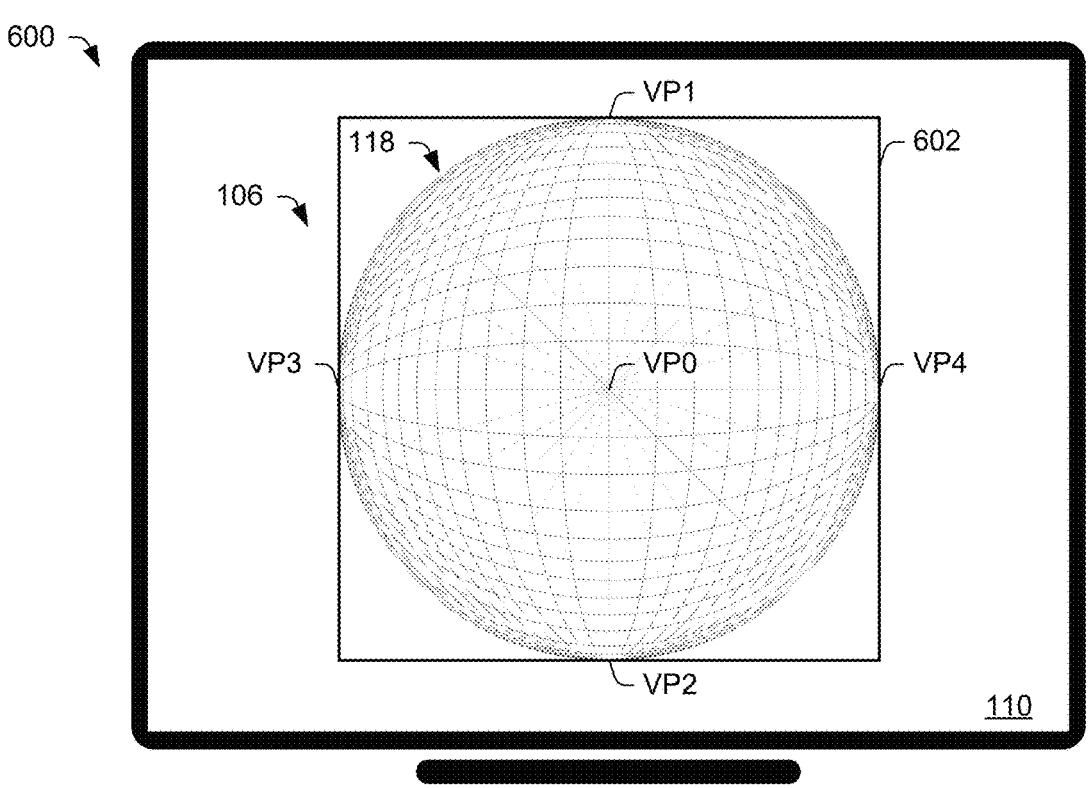
FIG. 6 depicts an example implementation of output of the curvilinear grid as a visual guide in support of editing a digital image.

FIG. 6 depicts an example implementation 600 of output of the curvilinear grid 118 as a visual guide in support of editing a digital image 106. The digital image 106 is defined using a canvas 602. The curvilinear grid 118 has a center vanishing point denoted as "VP0," a vertical top vanishing point represented as "VP1," a vertical bottom vanishing point denoted as "VP2," a horizontal left vanishing point represented as "VP3," and a horizontal right vanishing point represented as "VP4."

A variable "canvasheight" in the following discussion represents a height of the canvas 602 and a variable "canvaswidth" is a width of the canvas 602. Default positions of the vanishing points are therefore denoted as "(0,0)" for the center vanishing point of "VP0." The vertical top vanishing point of "VP1" is defined as "(0, −canvasheight/2)" and the vertical bottom vanishing point of "VP2" is defined as "(0, canvasheight/2)." The horizontal left vanishing point represented by "VP3" is defined as "(−canvaswidth/2, 0)" and the horizontal right vanishing point represented by "VP4" is defined as "(canvaswidth/2, 0)."

Figure 7:
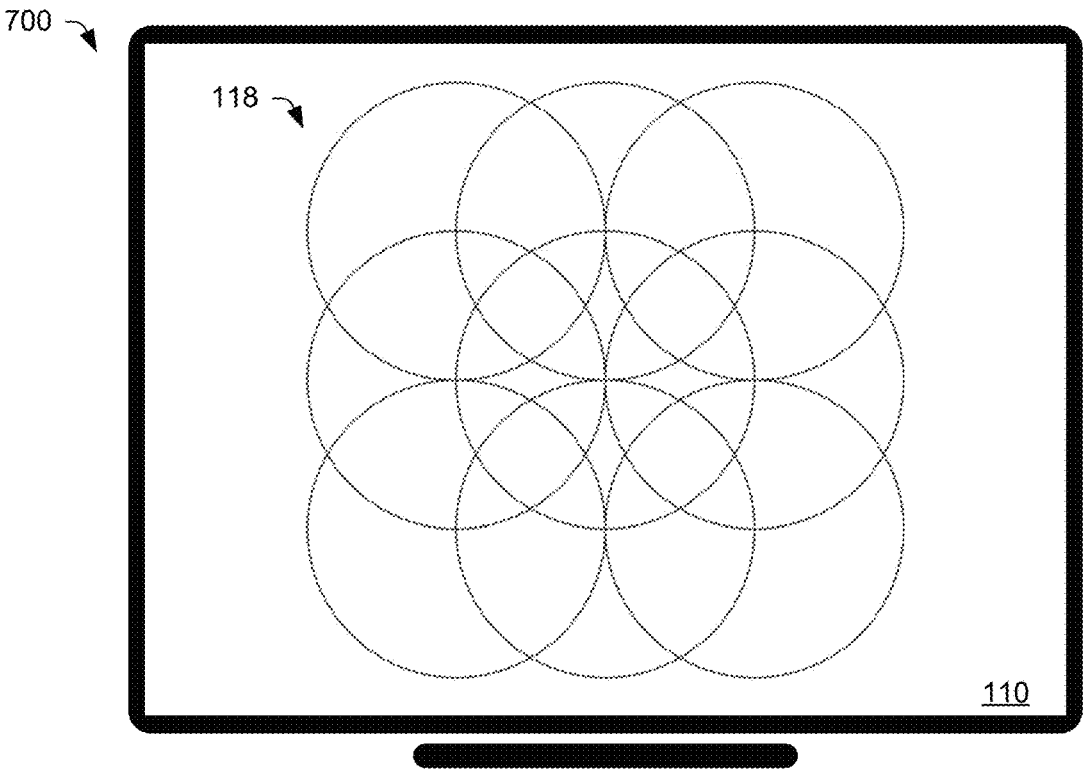
FIG. 7 depicts an example implementation of output of a plurality of curvilinear grids in a user interface.
Figure 8:
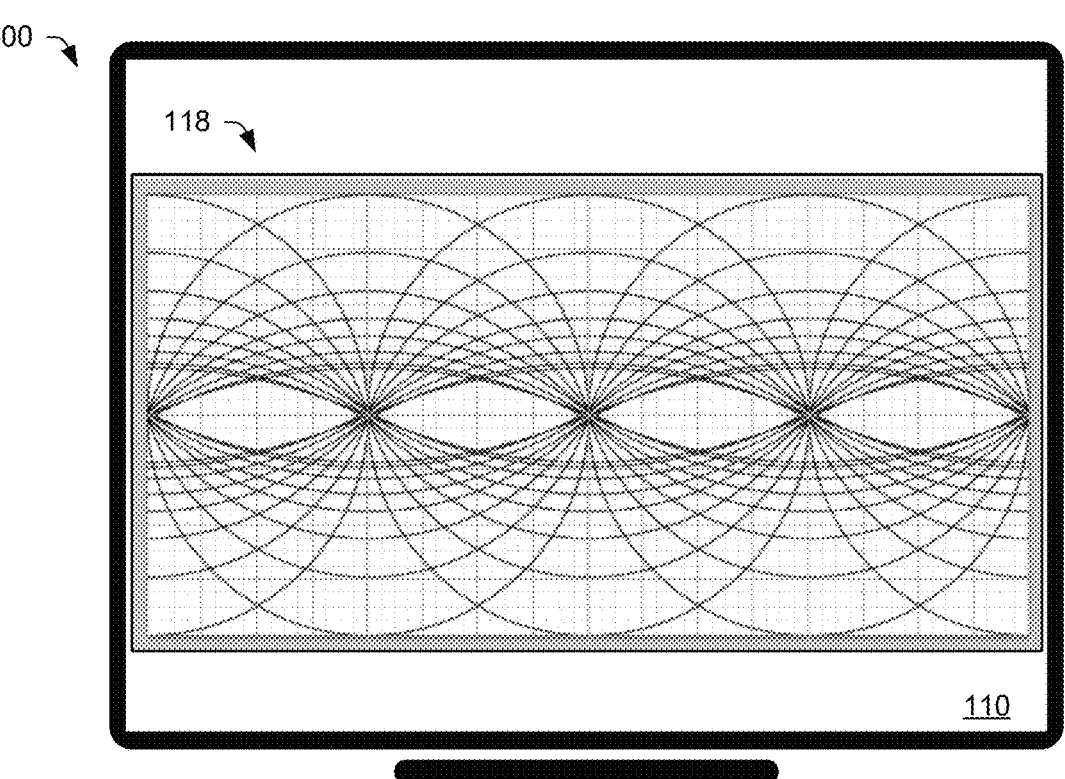
FIG. 8 depicts an example implementation showing axis of a curvilinear grid configured as ellipses along a horizontal direction.
Figure 9:
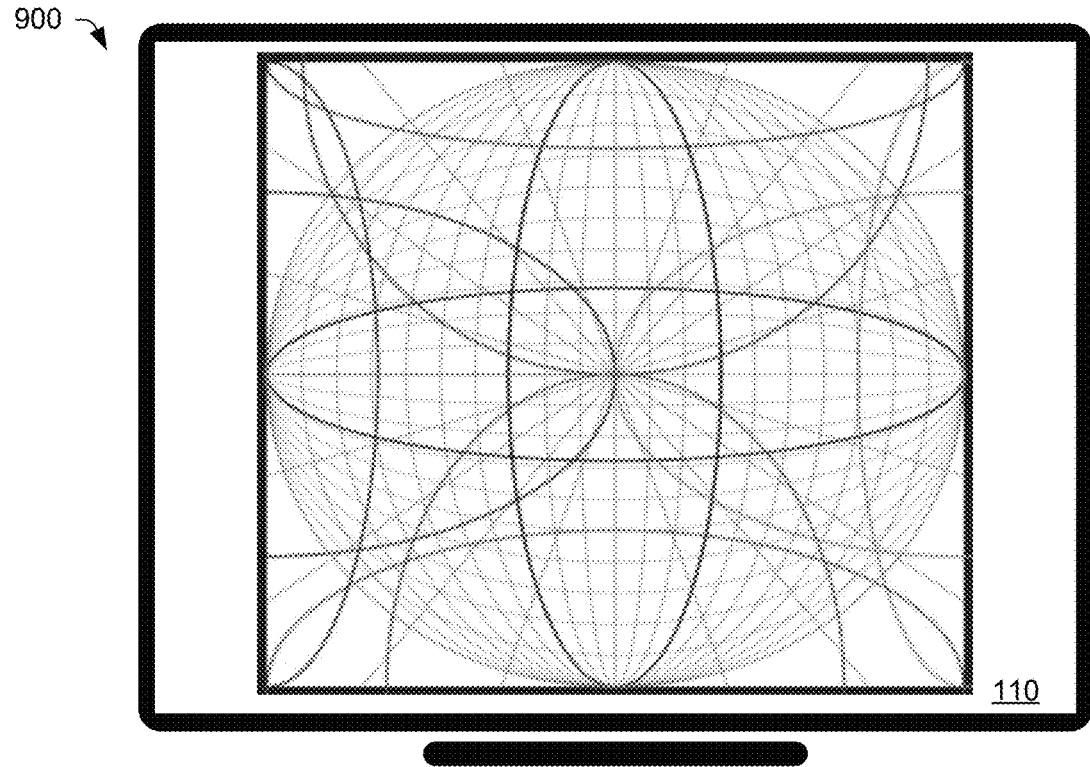
FIG. 9 depicts an example implementation showing axis of a curvilinear grid configured as ellipses along both horizontal and vertical directions.

FIG. 7 depicts an example implementation 700 of output of a plurality of curvilinear grids 118 in a user interface 110. In this illustrated example, each of the curvilinear grids 118 is represented as a circle. Each vanishing point is considered as a center for a next curvilinear grid 118. As such, this definition supports a continuous expansion of the curvilinear grids 118, which is also referred to as an "infinite" grid. FIG. 8 depicts an example implementation 800 showing the axis 122 of the curvilinear grid 118 configured as ellipses along a horizontal direction. FIG. 9 depicts an example implementation 900 showing the axis 122 of the curvilinear grid 118 configured as ellipses along both horizontal and vertical directions.

As previously described, the curvilinear editing system 116 supports modifications to the curvilinear grid 118. In order to edit locations of the vanishing point 120, for instance, the curvilinear editing system 116 applies a transformation to the curvilinear grid 118. For a single vanishing point, the transformation is applied solely to that vanishing point in an implementation example. A transformation matrix in this example includes a single translation where "tx" represents the translation in an "X" direction and "ty" represents a translation in a "Y" direction. The vanishing points are transformed per the following rules.

When either vertical vanishing point is translated, both the vertical vanishing points are translated to maintain an elliptical grid as follows:

$$VP1 = (VP1.x + tx, VP1.y + ty)$$

$$VP2 = (VP2.x + tx, VP2.y + ty)$$

When either horizontal vanishing point is translated, both the horizontal vanishing points are translated to maintain an elliptical grid as follows:

$$VP3 = (VP3.x + tx, VP3.y + ty)$$

$$VP4 = (VP4.x + tx, VP4.y + ty)$$

When the center vanishing point is translated, an entirety of the curvilinear grid 118 is translated, which is represented as:

$$VP_i = (VP_i.x + tx, VP_i.y + ty) \text{ such that } 0 \le i < 5$$

When the transformation is applied to a entirety of the curvilinear grid 118, the transform matrix include factors of scaling, rotation, and translation, which may be represented as:

$$T = \begin{bmatrix} sx & rx & 0 \\ ry & sy & 0 \\ tx & ty & 1 \end{bmatrix}$$

For translation, each of the vanishing points are translated with "(tx,ty)" and the locations are updated. For scaling, each of the vanishing points are scaled in a way that a distance with respect to a center vanishing points is scaled with a factor "(sx, sy)" which results in the movement of each of the vanishing points except the center vanishing point. For rotations, each of the vanishing points other than the center vanishing point is rotated as defined by a rotation value "(rx, ry)."

$$VP0 = (VP0.x + tx, VP0.y + ty)$$

$$VP_i = VP_i * T \text{ such that } 0 \le i < 5$$

When a transformation is applied to either a single vanishing point or an entirety of a curvilinear grid 118, each curvilinear grid 118 that is active by the curvilinear editing system 116 may also be translated according to the same rules, in one or more implementations. The curvilinear editing system 116, for instance, may maintain relative locations of five vanishing points and use those locations to calculate a plurality of curvilinear grids 118.

The axis 122 (e.g., grid lines) in one or more implementations are calculated by the axis formation module 212 using a plurality of ellipses where the center of the ellipse is center vanishing point (VP0). In a vertical ellipse, a major axis may be defined as the vertical vanishing points (e.g., "VP1" and "VP2") and a minor axis is defined based on a defined point equidistant from "VP0" between a line connecting "VP3" and "VP4." The largest minor axis may be defined between "VP0" and a horizontal vanishing point "VP3." In a horizontal ellipse, a major axis may be defined using the horizontal vanishing points ("VP3" and "VP2"). A largest minor axis is defined between "VP0" and a vertical vanishing point "VP1." A number of axis 122 (e.g., ellipses) to be generated for a single curvilinear grid 118 may be calculated by the axis formation module 212 based on the minor distance and a density of the grid.

Figure 10:
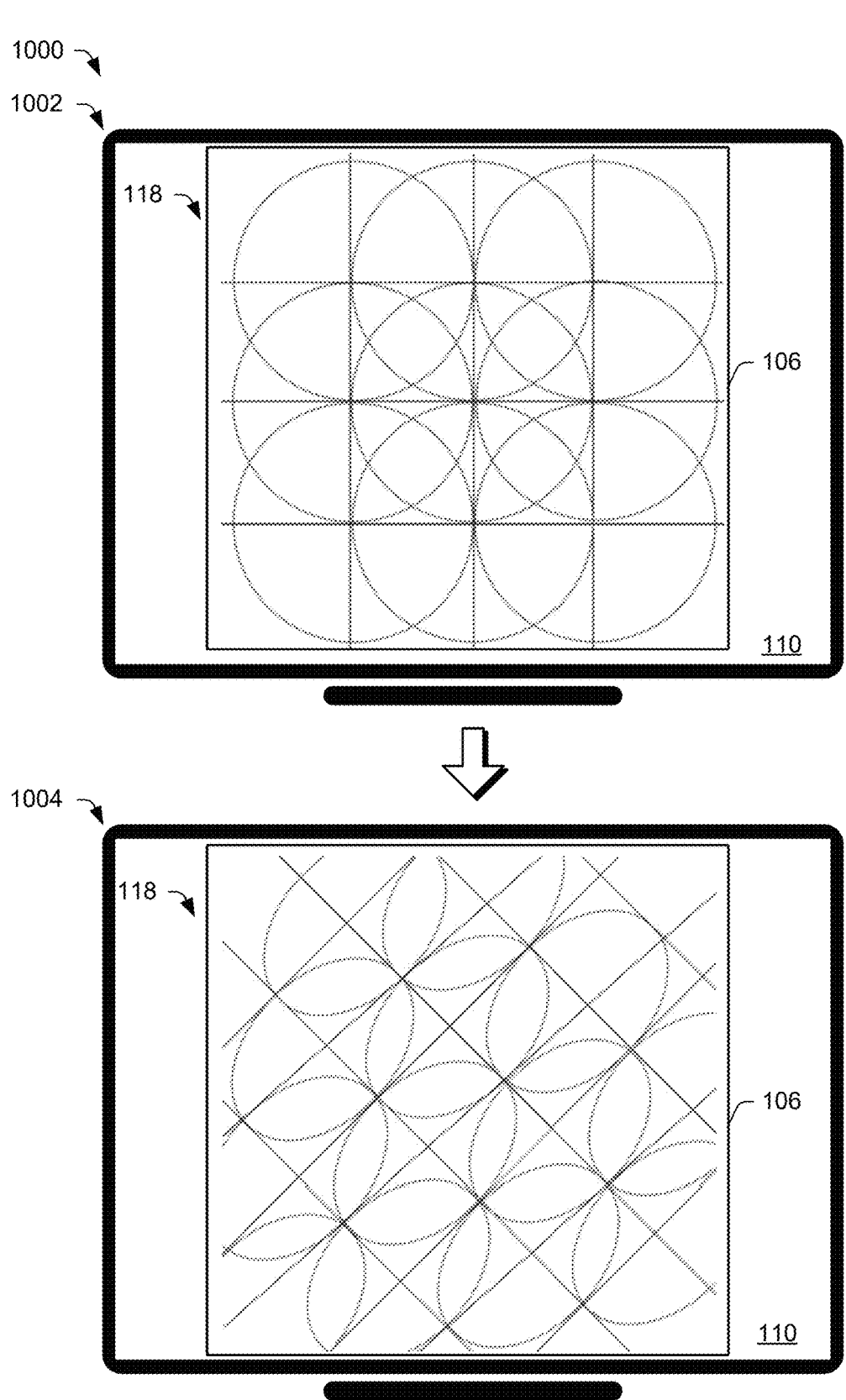
FIG. 10 illustrates an example system including various components of an example device that can be implemented as any type of computing device as described and/or utilize with reference to the previous figures to implement embodiments of the techniques described herein.

FIG. 10 depicts an example implementation 1000 of modification of a plurality of curvilinear grids 118 having a continuous relationship. This example is illustrated using a first stage 1002 and a second stage 1004. The plurality of curvilinear grids 118 are defined, similar to those of FIG. 7, in which a center of each curvilinear grid 118 is connected to form a regular rectangular grid as shown at the first stage 1002 where the intersecting lines represent a center. A distance between two centers is defined as:

$$[(a*dist(VP0,VP3),b*dist(VP0,VP1)]*T$$

where "a," "b∈N" and "T" defines a grid transformation. Therefore, changes in rotation and spacing between the centers is automatically populated across the curvilinear grids 118 as shown at the second stage 1004.

Figure 11:
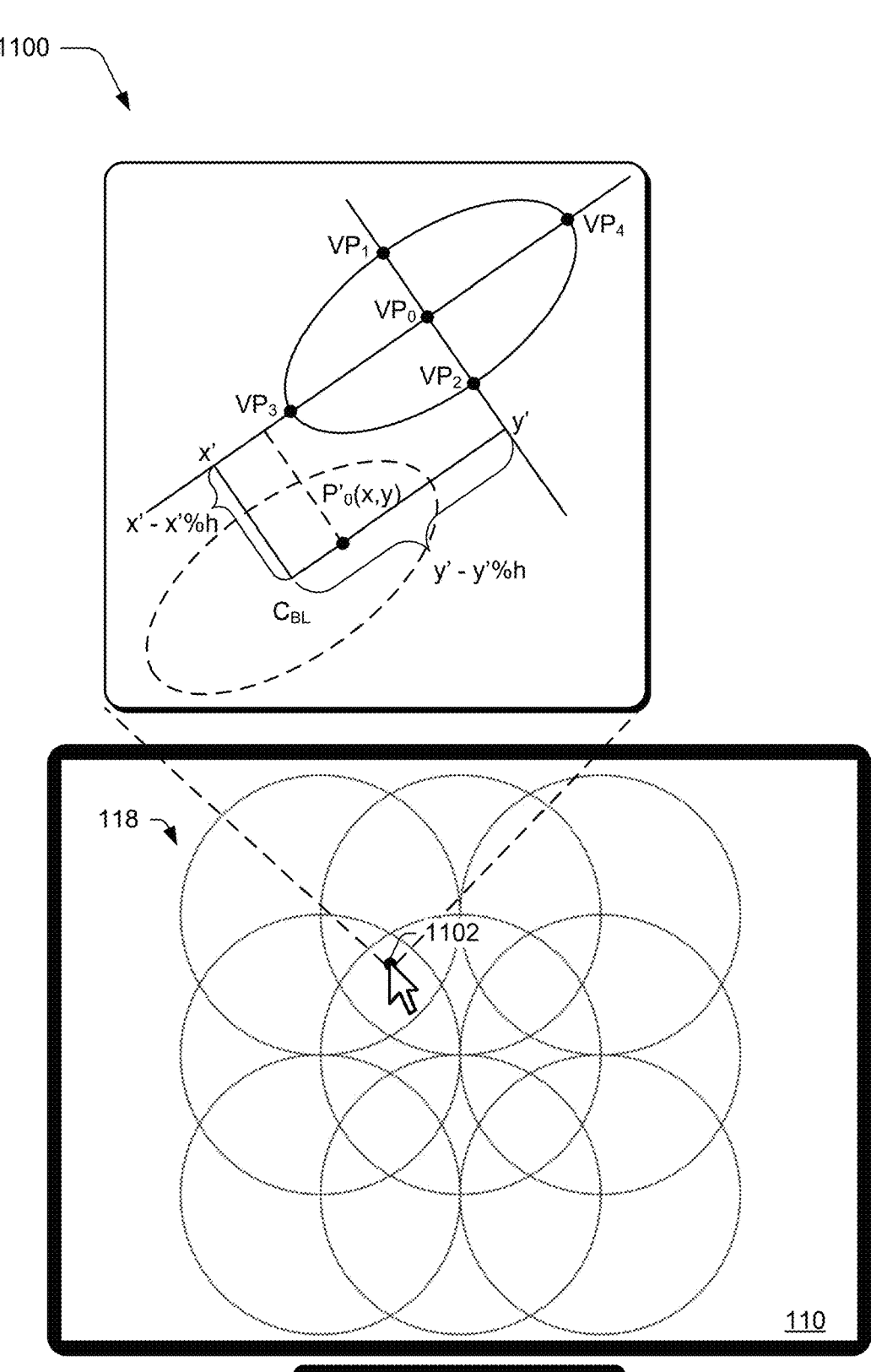
FIG. 11 depicts an example implementation of identifying which of a plurality of grids that are to be used to constrain an edit operation by the curvilinear editing system.

FIG. 11 depicts an example implementation 1100 of identifying which of a plurality of grids are to be used to constrain an edit operation by the curvilinear editing system

116. For an edit operation involving a location 1102 at point "P$_0$" as shown in the user interface 110, there is a maximum of four curvilinear grids 118 that intersect the location 1102. Accordingly, the conformation module 216 of the curvilinear editing system 116, in order to conform an edit operation, first identifies which curvilinear grid 118 is to serve as a basis for the conformation of the operation.

To do so in this example, since each of the ellipses that define respective curvilinear grids 118 are at an equal distance from each other, this property is leveraged by the conformation module 216 to find a center of each of the ellipses where the location 1102 at point "P$_0$" may lie. The conformation module 216 for instance, employs this property to find a bottom-left, top-left, top-right, and bottom-right centers of the curvilinear grids 118.

In order to file a center of the bottom-left ellipse as shown in FIG. 10, for instance, the conformation module 216 performs the following calculations:

x'=projection of P0.*x* to line VP0-VP3;
y'=projection of P0.*y* to line VP0-VP1; and
P'=(x', y').

The bottom-left center is calculated by the conformation module 216 as follows:

$$CBL = (P'.x - P'.x\%w, P'.y - P'.y\%h)$$

where "w=dist(VP0, VP3)," and "h=dist(VP0,VP1)."

Similarly, the conformation module 216 is operable to find a center for the other corners as follows:

Top left center $C_{TL}=C_{BL}+(0,h)$;
And apply grid transformation $C_{TL}=C_{TL}*T$;
Top right center $C_{TR}=[C_{BL}+(w,h)]*T$; and
Bottom right center $C_{BR}=[C_{BL}+(W,0)]*T$.

Using the four centers, the conformation module 216 adds the respective curvilinear grids 118 to a set of probable grids. The conformation module 216 then iterates through the set of probable grids to determine whether the location 1102 at point "P$_0$" is located within a respective curvilinear grid 118, which is represented as a "current grid." If the location 1102 at point "P$_0$" is within the current grid, an axis 122 (e.g., curve) is located and added in a "vector<curve>."

The location 1102 at point "P$_0$" may lie on two axis 122 of the curvilinear grid 118, i.e., a vertical axis and a horizontal axis. An equation of an ellipse for location 1102 at point "P$_0$" may be expressed as:

$$\frac{(P_0.x - h)^2}{a^2} + \frac{(P_0.y - k)^2}{b62} = 1$$

where "h" and "k" represent the center of the ellipse and "a," and "b" represent a distance of major and minor axis. To find the curve on a vertical ellipse, a value of "b" is a distance between vertical vanishing points "b=dist(VP1, VP2)" and the conformation module 216 calculates a value of "a." Similarly, to find the curve on a horizontal ellipse, a value of "a" is a distance between a horizontal vanishing points "a=dist(VP3, VP4)" and the conformation module 216 calculates a value of "b."

Upon input of a stroke, for instance, the conformation module 216 locates an axis 122 from above that is the closest, which is referred to as "closest_curve" in the following example. A vector "vector<curves>last_curves" is maintained by the conformation module 216 of a size threshold that represents previous closest curves. If each of the "last_curves" refer to a same "closest_curve," the conformation module 216 continues projecting the point on the same curve "closest_curve," otherwise the conformation module 216 updates the "closest_curve" to a current curve and then projects each of the previous saved samples on the updated "closest_curve." This process continues until a threshold number of points have been reached that, once crossed, the conformation module 216 continues projects to the "closest_curve," i.e., the conformation module 216 continues to use that curve without exploring other curves. Each point is saved in a variable "std::vector<std::pair<int, int>>samples" where the "pair" is used to save "X" and "Y" coordinates of the point.

When there is a curve mismatch, the conformation module 216 updates the "closest_curve" to the current closest curve. Previously saved samples are then projected onto the "closest_curve" and a parameteric position "prev_parameter" is calculated of the last projected sample and a new parameteric position "parameter" on the point "P" on the "closest_curve." The conformation module 216 then moves from "prev_parameter" to "parameter" (e.g., clockwise and counterclockwise) and a difference is calculated. The direction that is closest (i.e., has the minimum distance) is selected. If clockwise distance is less than counterclockwise distance, epsilon is set as "0.001" otherwise epsilon is set as "−0.001." The conformation module 216 then iterates from "prev_parameter" to "parameter" while increasing the value with epsilon and each parameter in the iteration is project on the "closest_curve." As a result, the conformation module 216 is configured to address curve mismatches. A variety of other examples are also contemplated.

In this way, the curvilinear editing system supports an ability to assist implementation of a curvilinear perspective as part of a digital image, thereby unlocking increased levels of visual engagement with increased accuracy that is not possible using conventional techniques.

Example System and Device

Figure 13:
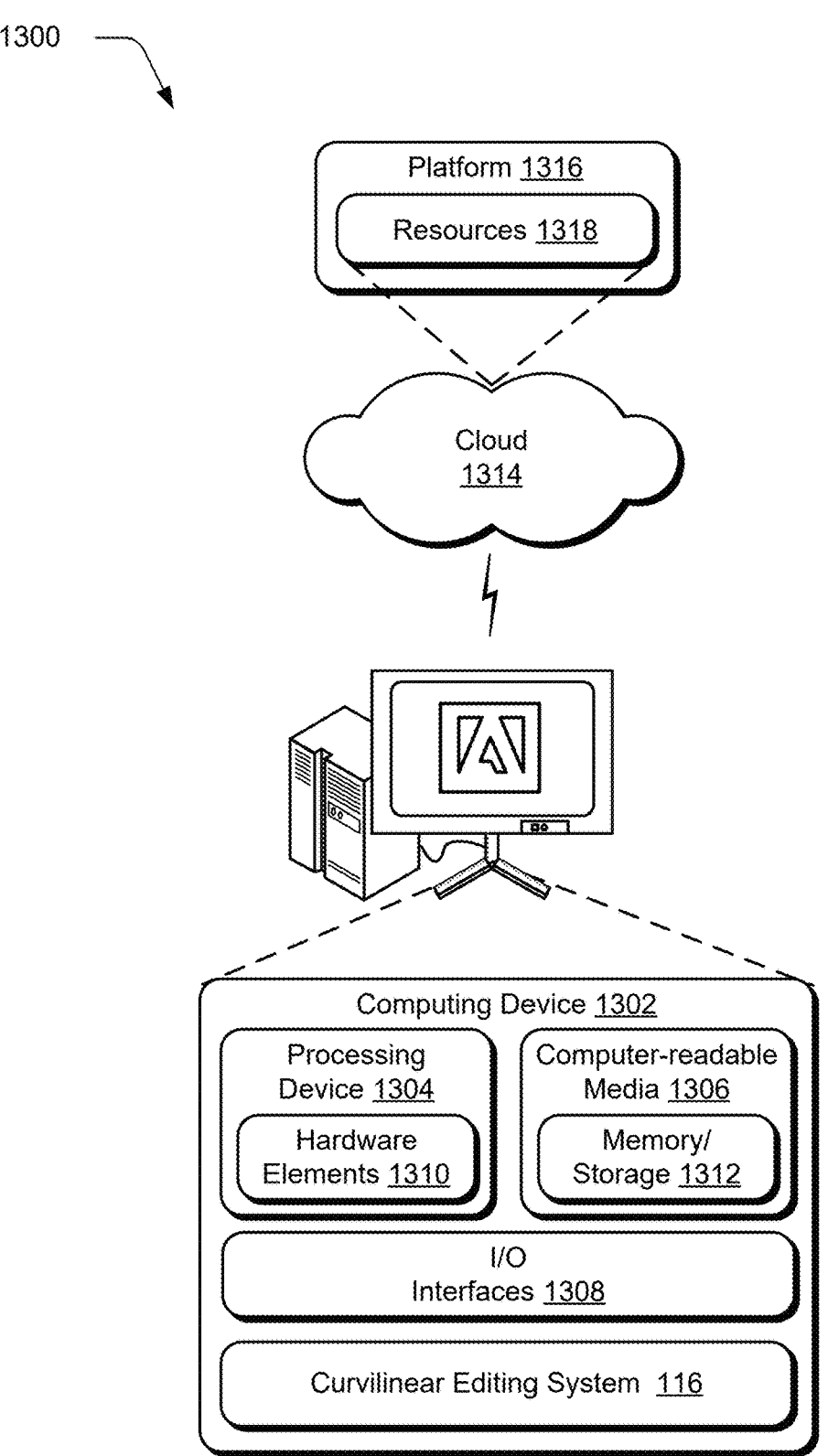
FIG. 13 illustrates an example system including various components of an example device that can be implemented as any type of computing device as described and/or utilize with reference to the previous figures to implement embodiments of the techniques described herein.

FIG. 13 illustrates an example system generally at 1300 that includes an example computing device 1302 that is representative of one or more computing systems and/or devices that implement the various techniques described herein. This is illustrated through inclusion of the curvilinear editing system 116. The computing device 1302 is configurable, for example, as a server of a service provider, a device associated with a client (e.g., a client device), an on-chip system, and/or any other suitable computing device or computing system.

The example computing device 1302 as illustrated includes a processing device 1304, one or more computer-readable media 1306, and one or more I/O interface 1308 that are communicatively coupled, one to another. Although not shown, the computing device 1302 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1304 is representative of functionality to perform one or more operations using hardware. Accordingly, the processing device 1304 is illustrated as including hardware element 1310 that is configurable as processors, functional blocks, and so forth. This includes implementation in hardware as an application specific integrated circuit or other logic device formed using one or more semiconductors. The hardware elements 1310 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1306 is illustrated as including memory/storage 1312 that stores instructions that are executable to cause the processing device 1304 to perform operations. The memory/storage 1312 represents memory/storage capacity associated with one or more computer-readable media. The memory/storage 1312 includes volatile media (such as random access memory (RAM)) and/or nonvolatile media (such as read only memory (ROM), Flash memory, optical disks, magnetic disks, and so forth). The memory/storage 1312 includes fixed media (e.g., RAM, ROM, a fixed hard drive, and so on) as well as removable media (e.g., Flash memory, a removable hard drive, an optical disc, and so forth). The computer-readable media 1306 is configurable in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1302. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1302, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1310. The computing device 1302 is configured to implement particular instructions and/or functions corresponding to the software and/or hardware modules. Accordingly, implementation of a module that is executable by the computing device 1302 as software is achieved at least partially in hardware, e.g., through use of computer-readable storage media and/or hardware elements 1310 of the processing device 1304. The instructions and/or functions are executable/operable by one or more articles of manufacture (for example, one or more computing devices 1302 and/or processing devices 1304) to implement techniques, modules, and examples described herein.

The techniques described herein are supported by various configurations of the computing device 1302 and are not limited to the specific examples of the techniques described herein. This functionality is also implementable all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 abstracts resources and functions to connect the computing device 1302 with other computing devices. The platform 1316 also serves to abstract scaling of resources to provide a corresponding level of scale to encountered demand for the resources 1318 that are implemented via the platform 1316. Accordingly, in an interconnected device embodiment, implementation of functionality described herein is distributable throughout the system 1300. For example, the functionality is implementable in part on the computing device 1302 as well as via the platform 1316 that abstracts the functionality of the cloud 1314.

In implementations, the platform 1316 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
presenting, by a processing device, a curvilinear grid for display in a user interface, the curvilinear grid depicting a plurality of axis that connect vanishing points and indicate a curvilinear perspective;
receiving, by the processing device, an input defining an edit operation to a digital image displayed in the user interface;
conforming, by the processing device, the input based on the curvilinear grid; and
outputting, by the processing device, the user interface having the edit operation applied to the digital image as conformed based on the curvilinear grid, in which the editing operation is a snapping operation that is configured to cause movement of an object from a first location to a second location in the user interface based on positioning of the object within a threshold distance with respect to the curvilinear grid.

2. The method as described in claim 1, wherein the curvilinear grid is formed using four or more of the vanishing points.

3. The method as described in claim 1, further comprising generating the curvilinear grid based on one or more user inputs received via the user interface.

4. The method as described in claim 3, wherein the one or more user inputs specify a number of the vanishing points that are to be used for generating the curvilinear grid.

5. The method as described in claim 3, wherein the one or more user inputs specify a number of the curvilinear grids to be output in the user interface.

6. The method as described in claim 1, further comprising:
generating a candidate curvilinear grid for display in the user interface;
receiving a modification to the candidate curvilinear grid; and
generating the curvilinear grid as having the modification to the candidate curvilinear grid.

7. The method as described in claim 6, wherein the modification involves relocation of at least one said vanishing point in the user interface.

8. The method as described in claim 6, wherein the modification involves relocation of the candidate curvilinear grid in the user interface from a first location to a second location.

9. The method as described in claim 6, wherein the modification involves movement of at least one axis of the candidate curvilinear grid in the user interface from a first location to a second location.

10. The method as described in claim 6, wherein the modification involves a change in orientation of the candidate curvilinear grid.

11. The method as described in claim 1, wherein the edit operation is a stroke operation and the conforming causes alignment of a stroke based on at least one said axis of the curvilinear grid.

12. The method as described in claim 1, wherein the edit operation is an alignment operation and the conforming causes alignment of an object based on at least one said axis of the curvilinear grid.

13. The method as described in claim 1, wherein the edit operation is an ordering operation that is configured to control a Z-ordering of a first object with respect to a second object in the user interface based on the curvilinear grid.

14. A system comprising:
a curvilinear grid generation module implemented using a processing device and computer-readable storage medium to arrange a plurality of curvilinear grids with respect to a user interface, the plurality of curvilinear grids defined, respectively, using vanishing points connected using a plurality of axis; and
an edit operation conformation module implemented using the processing device and computer-readable storage medium to identify one or more curvilinear grids of the plurality of curvilinear grids that correspond to an edit operation and conform the edit operation by modifying the edit operation automatically and without user intervention to align the edit operation with one or more axes of based on the one or more curvilinear grids to edit a digital image to employ curvilinear perspective.

15. The system as described in claim 14, wherein the vanishing points define centers of a respective said curvilinear grid of the plurality of curvilinear grids.

16. The system as described in claim 14, wherein at least one of the plurality of curvilinear grids is defined using at least five vanishing points.

17. One or more computer-readable storage media storing instructions that, responsive to execution by a processing device, causes the processing device to perform operations including:

receiving an input defining an edit operation to a digital image displayed in a user interface;

conforming the input by modifying the input automatically and without user intervention to align the input with one or more axes of te a curvilinear grid defined in relation to the user interface, the curvilinear grid formed using a plurality of vanishing points and a plurality of axis defining ellipses based on combinations of the plurality of vanishing points; and editing the digital image based on the conformed input.

18. The one or more computer-readable storage media as described in claim 17, wherein the curvilinear grid is defined using four or more said vanishing points.

19. The one or more computer-readable storage media as described in claim 17, wherein the operations further comprising identifying the curvilinear grid from a plurality of curvilinear grids in the user interface.

20. The one or more computer-readable storage media as described in claim 17, wherein the editing operation is a snapping operation that is configured to cause movement of an object from a first location to a second location in the user interface based on positioning of the object within a threshold distance with respect to the curvilinear grid.

* * * * *